Nov. 2, 1926.  
J. B. GUTHRIE  
HARROW  
Filed July 16, 1925  
1,605,183  
2 Sheets-Sheet 1

INVENTOR.  
J B Guthrie.  
BY  
ATTORNEY

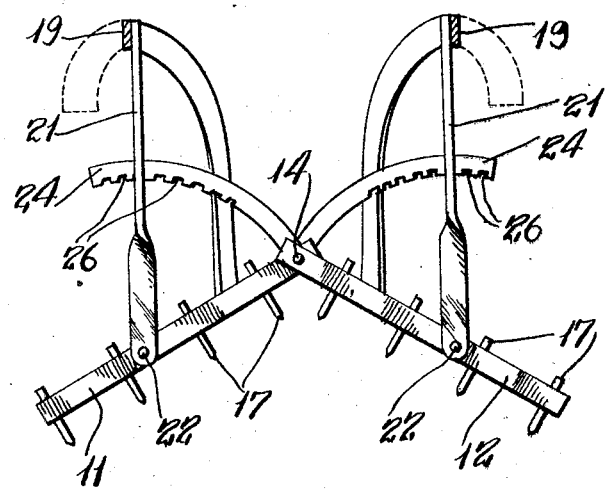

Patented Nov. 2, 1926.

1,605,183

UNITED STATES PATENT OFFICE.

JAMES B. GUTHRIE, OF MEMPHIS, TENNESSEE.

HARROW.

Application filed July 16, 1925. Serial No. 44,050.

This invention relates to agricultural machinery and has special reference to a harrow.

More particularly this invention has reference to a harrow capable not only of harrowing flat surfaces but also of harrowing ridges and furrows.

One important object of the invention is to improve the general construction of devices of this character.

A second important object of the invention is to provide an improved form of harrow made in two sections so arranged that they may be varied in angular relation to harrow the two sides of a ridge, a flat surface, or the two sides of a furrow.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 2 is a rear view of one modification thereof.

Figure 1:
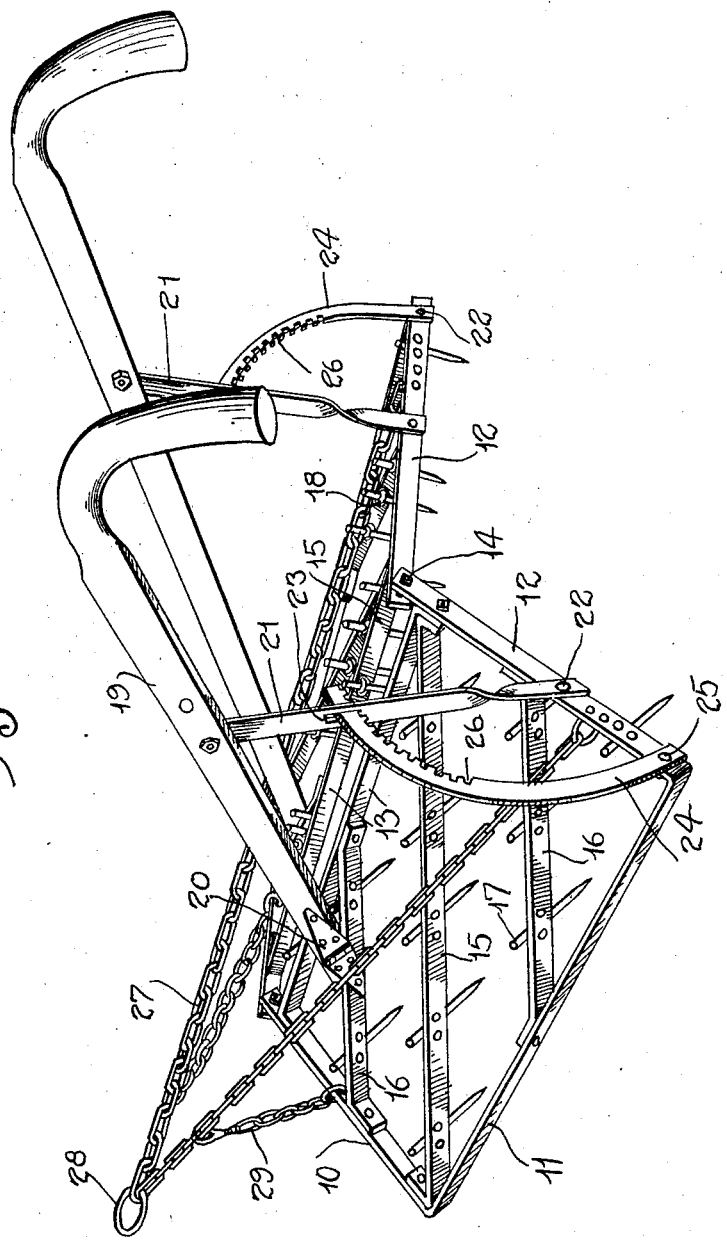
Figure 1 is a perspective view of a harrow constructed in accordance with this invention.

In the construction of this device the harrow is made of a pair of sections each having an outer rectangular frame consisting of a bar bent to form a front end member 10, a side member 11 and a rear end member 12. The end members 10 and 12 are connected adjacent their extremities by inner side bars 13, the end members 10 and 12 projecting inwardly of the inner side bars 13 and these inwardly projecting ends are connected by pivot bolts 14. Extending diagonally across each frame is a brace bar 15 which extends from the inner rear end of the frame to the outer front end thereof and other brace members 16 are disposed in parallel relation to each member 15 between the side and end members of the frame. Each of these diagonal brace members carries harrow teeth 17, the same being secured by U-bolts 18.

In connection with these frames there is provided a pair of handles 19, each of which has its forward end connected to the forward brace member 16 by an ordinary strap hinge 20 so as to permit lateral swinging movement of the handle with respect to the frame to which it is hinged. Depending from each handle is a brace rod 21 having its lower end pivoted as at 22 to the rear end member 12 of a respective frame. Each brace rod is provided with a laterally extending opening 23, through which passes the free end of an arc bar 24 which has one end pivoted as at 25, to the rear outer corner of a respective frame. Each arc bar is provided with notches 26 engaging selectively with the lower edge of the opening 23 in a respective bar 21. Chains 27 extend forwardly from the members 12 and terminate in a draft eye 28. Other draft chains 29 connect the first mentioned chains with the front frame member 10.

In the form shown in Figure 2 the bars 24 are pivoted to the center pivot 14 and curved outwardly.

Under these conditions it will be seen that by lifting the arc bars 24 and adjusting them in the opening 23 the angle between the two frames forming the halves of the harrow may be regulated.

There has thus been provided a simple an efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. A harrow including a pair of rectangular sections having proximal edges hingedly connected, a pair of handles each hinged to a respective section near the front thereof and extending rearwardly over the rear end of said section, brace rods each extending downwardly from a handle and pivoted at its lower end to the rear of a respective section, each of said brace rods having a transversely extending opening therein intermediate its ends, and arc bars each having ends pivoted to the frames and extending through the opening of a respective brace bar and being provided with notches for selective engagement by the edge of its opening.

2. In a harrow, a pair of sections each having a rectangular frame including side and end members, the end members of each section being extended toward the end members of the other section and pivotally connected thereto, a pair of handles each hinged to one of the sections for lateral swinging movement with respect to said section, brace rods each depending from a respective handle and having its lower end pivoted to the rear end member of a respective frame, each brace rod being provided with a laterally extending opening, and arc bars each pivoted to a respective frame at the outer rear corner thereof and passing through the opening of a respective brace bar, said arc bars being substantially concentric to the pivoted points of the brace bars and having notches on the under sides for selective engagement by the lower edges of said openings.

In testimony whereof I affix my signature.

JAMES B. GUTHRIE.